Aug. 2, 1960
A. M. MASTERS
2,947,093
MOUNTING CONSTRUCTION AND THE COMBINATION
THEREOF WITH A BOARD
Filed Aug. 21, 1957
2 Sheets-Sheet 1

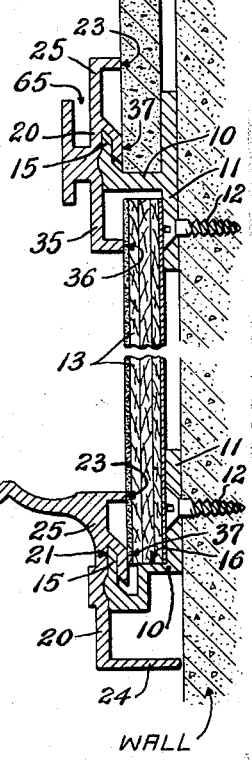

INVENTOR.
ALBERT M. MASTERS
BY
Bohleber, Fassett & Montstream
ATTORNEYS

Aug. 2, 1960  A. M. MASTERS  2,947,093
MOUNTING CONSTRUCTION AND THE COMBINATION
THEREOF WITH A BOARD
Filed Aug. 21, 1957  2 Sheets-Sheet 2
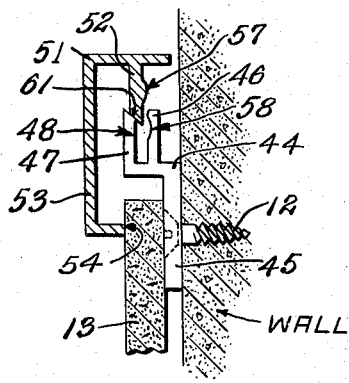
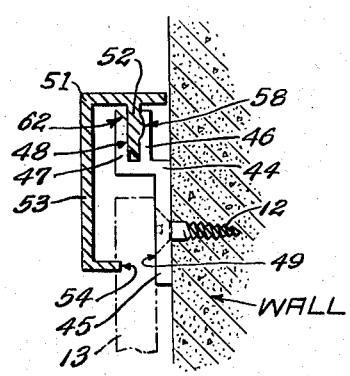
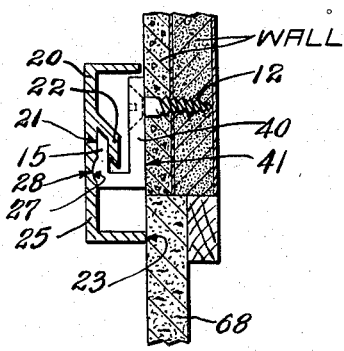
INVENTOR.
ALBERT M. MASTERS

United States Patent Office 2,947,093
Patented Aug. 2, 1960

2,947,093

MOUNTING CONSTRUCTION AND THE COMBINATION THEREOF WITH A BOARD

Albert M. Masters, P.O. Box 155, Pen Argyl, Pa.

Filed Aug. 21, 1957, Ser. No. 679,487

14 Claims. (Cl. 35—65)

The invention relates to a mounting construction, mechanism or means for boards such as chalk boards, tack boards, mirrors and the like. The usual method of securing a chalk or tack board on a wall is to use a base or anchoring means which is secured to the wall. A clamping member is carried by the anchoring means which is operated by a clamping screw to clamp the board to the wall or anchoring means. In the construction of the invention a clamping screw or screws are dispensed with and the board is clamped merely by laterally pressing or forcing a trim strip member laterally with respect to a base or anchorage member or members. A considerable saving of time results in mounting a board by this construction and a saving in manufacturing costs results by dispensing with a clamping screw and its threaded hole.

It is an object of the invention to provide a mounting mechanism or construction which eliminates clamping screws and secures clamping action by laterally pressing a clamping and trim strip laterally with respect to the base or anchoring member or members which are secured to a wall.

Another object is to provide a mounting construction for a board in which a clamping and trim strip member is pressed laterally onto the anchorage or base members which provides two clamping surfaces for the board.

Another object of the invention is to provide a mounting construction for a board in which a clamping and trim strip member is pressed laterally into engagement with a base member or members and has two clamping surfaces for clamping two adjacent boards to the wall.

Other objects of the invention will be more apparent from the following description when taken in connection with the accompanying drawings illustrating preferred embodiments thereof in which:

Fig. 7 is a cross section through a mounting construction for clamping a board in which the lateral movement of the clamping and trim strip or member is towards the center of the board;

Fig. 8 is a section through the mounting construction of Fig. 7 after the clamping and trim member has been laterally moved into clamping position;

Fig. 9 shows the mounting construction used to clamp a panel or wainscoting to a wall.

Figure 2:
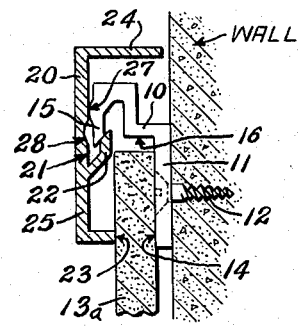
Fig. 2 is a cross section through a clamping and trim strip member adjacent a base member and through a portion of the chalk board prior to lateral movement of the former for clamping engagement with a base member.
Figure 3:
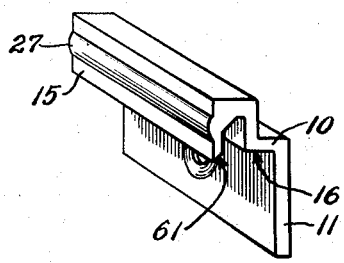
Fig. 3 is a perspective view of the base member.

The mounting construction or means includes a base member 10 having a base plate 11 which is adapted to be secured to a wall such as by means of a screw 12. In the construction of Figs. 1 to 4, the base plate is directed inwardly with respect to the board so that the inner face of the board 13 rests on the top surface 14 of the base plate. The base member carries a flange 15 spaced from the base plate forming one part of an interengaging means. The flange 15 extends approximately parallel with respect to the base plate.

The base or anchorage member has a ledge 16 upon which the lower edge of the board may rest when this member is positioned at the bottom of the board. In the base member illustrated the flange 15 extends from the ledge. The base member may be a continuous strip extending the full length of a side of the board, however, it is preferable, in that it is less expensive, to use a plurality of relatively narrow base members spaced apart along the edges of the board to be mounted.

The edges of the board, and preferably the base members too, are concealed behind a combined clamping and trim strip or member 20 which may extend the full length of the board at top and bottom and substantially the full length of the sides, since the side strips or members fit in between the top and bottom trim strip. It is clear too that the side trim strips may extend the full height of the board and the top and bottom trim strips may fit between the side trim strips. Or the trim strips may be shorter than the respective side of the board and a corner fill-in piece inserted at each corner. The clamping and trim member is provided with a channel or groove 21 which is slightly wider than the thickness of the flange 15 so that the flange may be received therein. A simple way of forming a groove is to provide a channel or groove flange 22 carried on the inner side of the clamping and trim member. The flange 15 and channel or groove 21 extend approximately parallel to the outer surface of the board and hence approximately parallel with the plane of that surface of the base plate against which the inner surface of the board rests or is contiguous with. The clamping and trim member includes a clamping extension 25 having a clamping surface 23 which clamping surface is spaced from the cooperating interengaging means or the groove. This clamping surface is also spaced from the inner surface of the board or the outer or contact surface 14 of the base plate 11, a distance less than the thickness of the board to be clamped when the two members are assembled together, as illustrated particularly in Fig. 4. The clamping and the trim member may have a skirt 24 extending towards the wall which when assembled extends over and conceals the spaced base members.

In mounting a board or boards to a wall, the base member or spaced base members are secured to the wall where the top and bottom and sides of the board is to be located. The board 13 is then placed on the ledge 16 of the lower base members so that the back of the board contacts the outer surface 14 of the base plates. A clamping and trim member is then placed as shown in Fig. 2 and forced laterally so that the flange 15 enters the channel or groove 21 and in so doing the clamping extension 25 may be flexed to give clamping contact of the surface 23 with the outer surface of the board. The flange is long enough to press the clamping surface into clamping contact with the outer surface of the board. The flexibility in the mounting mechanism or construction may be either in the clamping extension of the clamping and trim member or it may be in any part of the base member. Usually both members will flex to give clamping engagement of the clamping surface with the outer surface of the board.

It is desirable that locking means be provided when the clamping and trim member 20 has been pressed laterally so that the flange and channel or groove interengage and the two members are in assembled relation. This interlocking means is shown as a projection carried by one member and a cooperating locking depression carried by the other member. In the construction particularly illustrated, the locking means is a projection in the form of a ridge 27 carried by the base member and a cooperating locking groove 28 which is located to receive the projecting ridge when the two members are assembled together. The groove may extend continuously in the clamping and trim member so that any desired spacing of the base member may be made. In pressing the two parts into interlocking engagement of the locking means, one of the members flexes until the ridge and groove are in interlocking relation.

Figure 1:
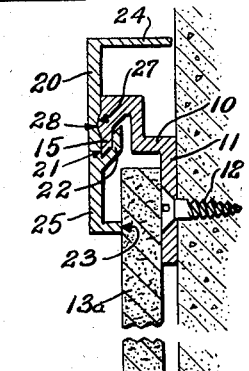
Fig. 1 is a vertical section through the mounting means as used in connection with an upper tack board and a lower chalk board as taken on line 1—1 of Fig. 6.
Figure 4:
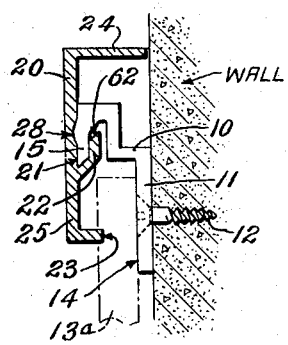
Fig. 4 is a section similar to Fig. 2 without the board clamped thereby.

As shown in the center mounting of Fig. 1, the mounting construction or mechanism may be a construction to simultaneously clamp the edges of two adjacent boards, such as a tack or cork board 13a as well as the chalk board. In order to accomplish this, the clamping and trim member carries a second clamping extension 35 which is on the opposite side of the interengaging means from the first clamping extension or extends in the opposite direction to that of the first clamping extension 25. This clamping extension also carries a clamping surface 36 spaced from the interengaging means and spaced from the inner surface of the board or the top surface 14 of the base plate 11 which is shown as extending on both sides of the flange, a distance less than the thickness of the board. The other parts of the clamping and trim member and of the base member correspond with the same parts of the construction of Figs. 1 to 4 and are similarly numbered. This double mounting construction is assembled in the same manner as that previously described with the interengaging means pressed or hammered into interengaging relation by lateral movement of the clamping and trim member relatively to the base member or members. In this double mounting means, the flexibility is in at least one of the clamping extensions of the clamping and trim member.

If desired a second clamping surface may be provided for one board by locating the surface 37 of the flange 22 which forms the channel 21 so that in assembled relation with the base member or flange 15 the distance between the inner face of surface 37 of the flange 22 and the top surface of the base plate is less than the board thickness. When the interengagement means is brought into interengagement by lateral pressing or hammering of the clamping and trim member laterally to bring the interengaging flange and the channel or groove into interengagement, this surface presses against the outer surface of the board and provides additional clamping action. If desired the surface 37 may provide the sole clamping surface and the clamping extension and its clamping surface may be dispensed with.

Figure 5:
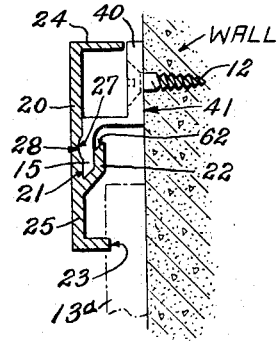
Fig. 5 is a section similar to Fig. 4 for a modified form of base member.
Figure 6:
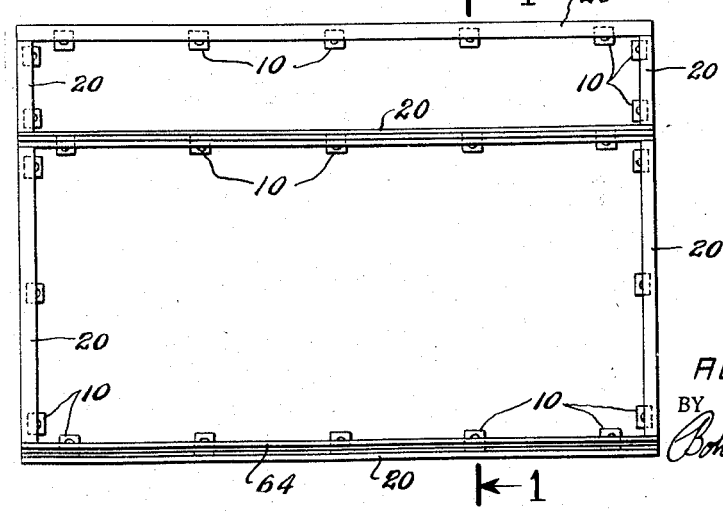
Fig. 6 is an elevation of the mounting means for securing a tack board and a chalk board upon a wall without the boards.

Figure 5 illustrates a modified form of construction in which the base 40 extends in the opposite direction from the direction of the flange 15. In other respects the construction is the same. In this construction, the back surface of the board 13 rests against the surface of the wall upon which the board is to be mounted which is contiguous with or in the same plane as the inner surface 41 of the base plate. In such construction the clamping surface 23 is spaced from the plane of the inner surface of the base plate, a distance less than the thickness of the board so that clamping action may be secured. In the event that the inner surface 37 of the flange 22 is also to be used as a clamping surface, then in that event this surface also is spaced from the plane of the inner face of the board or the inner surface 41 of the base plate, a distance less than the thickness of the board to be clamped.

It is immaterial which member carries the channel or groove and which member carries the flange of the interengaging means. It is also not essential that the lateral movement be in a direction towards the edge of the board as shown in the constructions of Figs. 1 through 5 although the second clamping extension 35 of the double mounting means for two boards in Fig. 1 moves laterally away from the edge of the board. In Figs. 7 and 8, a mounting construction is illustrated in which the channel or groove is carried by the base member and the flange is carried by the clamping and trim member or strip. In this form of construction, the base or anchor member 44 has a base plate 45 which is secured to the wall in any suitable manner. This base member has a pair of spaced flanges namely a channel flange 46 and a flange 47 forming a part of the base plate which flanges are spaced apart to form a groove 48 therebetween. The groove has a width slightly greater than the flange to be received therein and is approximately parallel with the surface to be clamped or one of the surfaces of the base plate.

The clamping and trim member 51 carries a flange 52 forming the other part of the interengaging means and is received in the channel or groove 48 upon forcing the clamping and trim member laterally with respect to the base member. The member 51 carries a clamping extension 53 extending over the outer surface of the board 13 and having a clamping surface 54 spaced laterally from the interengaging means. The clamping surface is spaced from the plane of that surface of the base plate which is contiguous with the back surface of the board by a distance a little less than the thickness of the board 13 to be clamped. In the construction particularly illustrated, this is the top surface 49 of the base plate. With this form of mounting means in which the clamping and trim member is pressed away from the edge of the board, mitered corners may be used.

Locking means is provided to lock the two members in assembled relation which means includes a projection or ridge carried by one member and a cooperating locking groove carried by the other member. In the construction shown the locking projection or ridge 57 is carried by the flange 52 and the locking groove 58 is carried by a flange 46 forming one side of the channel or interengaging groove. The flange 46 has sufficient resiliency to yield and flex back into interlocking relation with the ridge 57 when the flange is pressed into the groove.

In all of the constructions illustrated at least one of the ends of the interengaging flange 15 and 52 may have an inclined end or edge 61 for facilitating interengagement of the interengaging means. The flange 22 and flange 47 forming the channel or groove may have a similar inclined end or edge 62 if desired. Also the flexibility of the base member may be selected by selecting the length thereof, that is a relatively longer base member would increase its stiffness and a shorter base member would result in a softer or more flexible base member.

The clamping and trim member or strip may carry other parts suitable for auxiliary use. This is illustrated in the lower clamping and trim member in which a chalk rail 64 forms a part of the member. The center clamping and trim member has a card or clip groove 65.

Fig. 9 illustrates the mounting construction used for securing a panel such as wainscoting 68 to a wall. The construction is essentially the same as that of Figs. 1 to 4 excepting that here the clamping surface is slightly below the plane of the inner surface of the base plate since the outer surface of the board 68 is level with the surface of the wall.

In all of the constructions illustrated each clamping surface is located with respect to the board which it is to clamp when the base member and the clamping and trim member are assembled without a board, so that the clamping surface is inwardly of the outer surface of the board. The flange and channel or groove of the interengaging means may be parallel or approximately parallel with respect to the outer surface of the board and the term parallel or approximately parallel as used herein contemplates parallelism or some angularity with respect to the outer surface of the board. The mounting construction may secure clamping of the board solely through the use of the flange 22 carried by the clamping and trim member with its clamping surface 37 in which construction flexibility will be in the base member and a longer flange may be used to assure engagement with the board at the upper edge without requiring precise location of the base members at the edge.

An additional advantage in the mounting constructions illustrated is that the clamping surface 23 of the clamping and trim member contacts the board and provides a closed edge at this point. A further advantage is that the skirt 24 may if desired have a length so that its end engages the surface of the wall and closes any gap at this edge. It would thus be similar to the center clamp of Fig. 1. Also in the constructions having a clamping and trim member which is shifted towards the edge of the board for clamping action, the base members may be located so that the skirt 24 abuts or engages a cabinet or wall adjacent the board and closes any gap at this point; when this condition exists, there is no need of a skirt 24 and the edge of the trim strip may engage this projecting wall or cabinet. These three advantages have been difficult or impossible to achieve with prior mounting constructions.

This invention is presented to fill a need for improvements in a mounting construction and the combination thereof with a board. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A mounting construction for chalk boards, cork boards and the like having an outer surface and thickness comprising at least one base member having means adapted to be secured to a wall, a clamping and trim member of a substantial length; cooperating interengaging means located and concealed within the trim member including a flange carried by one member having a predetermined thickness and the other member having a channel flange rigidly fixed thereto and spaced therefrom forming a cooperating channel, the channel having a width slightly greater than the thickness of the flange to freely receive the flange upon pressing the clamping and trim member laterally with respect to the base member to interengage with the flange, and the flange and cooperating channel extending parallel or approximately parallel with respect to the outer surface of the board to be clamped; the clamping and trim member having at least one clamping surface spaced inwardly from the outer surface of the board to be clamped when assembled with the base member and spaced from the cooperating interengaging means to engage and clamp the board; and at least one of said members being resilient at a point spaced from the interengaging means to flex upon lateral interengagement of the flange and interengaging channel when assembled with the board.

2. A mounting means as in claim 1 including interengaging locking means carried by the members and located to be interengaged when the flange and channel are in interengagement.

3. A mounting construction as in claim 2 in which the locking means includes a locking projection carried by one of the members and a cooperating locking groove carried by the other member located to be interengaged when the flange and channel are in interengagement.

4. A mounting construction as in claim 1 in which the flange is carried by the base member and the interengaging channel is carried by the clamping and trim member.

5. A mounting construction as in claim 4 in which the clamping and trim member includes a trim portion and a channel flange carried thereby spaced from the trim portion to form the channel, the channel flange having an inner flange surface spaced inwardly from the outer surface of the board when assembled upon the base member without a board to provide a second clamping surface.

6. A mounting construction for two boards as in claim 1 including a clamping extension carried by the clamping and trim member having a clamping surface spaced inwardly from the outer surface of the second board when assembled with the base member and spaced laterally from the interengaging means on the opposite side of the latter from the other clamping surface.

7. A mounting construction as in claim 6 in which the clamping and trim member carries the interengaging channel and includes a trim portion and channel flange carried thereby spaced from the trim portion to form the channel, the channel flange having an inner flange surface spaced inwardly from the outer surface of the board when assembled upon the base member.

8. A mounting construction as in claim 1 in which the means to secure the base member to a wall is a base plate extending beneath the clamping surface on the clamping and trim member, and the base plate has an outer surface to engage the inner surface of the board to be clamped.

9. A mounting construction as in claim 1 in which the flange is carried by the clamping and trim member and the interengaging channel is carried by the base member.

10. A mounting construction as in claim 1 in which the means to secure the base member to a wall is a base plate having an outer and inner base plate surface, and the clamping surface of the clamping and trim member is spaced from the plane of one of the base plate surfaces a distance less than the thickness of the board to be clamped.

11. A mounting construction as in claim 1 in which the means to secure the base member to a wall is a base plate extending underneath the interengaging means and having an outer base plate surface to engage the inner surface of a board, and the clamping surface is spaced from the outer base plate surface a distance less than the thickness of the board to be clamped.

12. A mounting construction for chalk boards, cork boards and the like having an outer surface and thickness comprising at least one base member having means adapted to be secured to a wall, a clamping and trim member of a substantial length; cooperating interengaging means located within and concealed by the trim member including a first flange having parallel sides and carried by one member and located to be spaced from and over the outer surface of a board and the other member having a cooperating channel flange rigidly fixed to the member, the cooperating channel flange having a thickness greater than the space between the first flange and the board, the cooperating flange being spaced from the member a distance slightly greater than the first flange to form a channel with parallel sides to freely receive the first flange upon pressing the clamping and trim member laterally with respect to the base member to interengage with the first flange, and the first flange and cooperating flange extending approximately parallel with respect to the outer surface of the board to be clamped; and at least one of said members being resilient at a point spaced from the interengaging means to flex upon lateral interengagement of the first flange and the channel formed by the cooperating flange when assembled with a board.

13. A mounting construction as in claim 12 including locking means carried by the interengaging means engageable upon lateral assembly of the clamping and trim member with respect to the base member.

14. In combination, a board for chalk or tacks having an outer surface and a mounting construction for the board, the mounting construction comprising at least one base member having means adapted to secure the member to a wall, a clamping and trim member of a substantial length; cooperating interengaging means located within and concealed by the trim member including a flange carried by one member having a predetermined thickness and parallel sides the other member having a channel flange forming a cooperating interengaging channel, the channel having parallel sides and having a width slightly greater than the thickness of the flange to freely receive the flange upon pressing the clamping and trim member laterally with respect to the base member to interengage with the flange, and the flange and interengaging channel extending approximately parallel with respect to the outer surface of the board, the clamping and trim member having at least one clamping surface spaced inwardly from the outer surface of the board when assembled with the base member without a board and spaced from the cooperating interengaging means to engage and clamp the other surface of the board; and at least one of said members being resilient at a point spaced from the interengaging means to flex upon lateral interengagement of the flange and interengaging channel.

References Cited in the file of this patent
UNITED STATES PATENTS

| | | |
|---|---|---|
| 1,223,609 | Peters | Apr. 24, 1917 |
| 1,848,907 | Schaffert | Mar. 8, 1932 |
| 1,873,350 | Smith | Aug. 23, 1932 |
| 2,239,517 | Cox et al. | Apr. 22, 1941 |
| 2,338,146 | Urbain | Jan. 4, 1944 |
| 2,651,852 | Urbain | Sept. 15, 1953 |